United States Patent Office 2,850,536
Patented Sept. 2, 1958

2,850,536
PRODUCTION OF DIALDEHYDES AND CONVERSION PRODUCTS THEREOF

Karl Büchner, Duisburg-Hamborn, Otto Roelen, Oberhausen-Holten, and Josef Meis, Oberhausen-Osterfeld, Germany, assignors to Ruhrchemie Aktiengesellschaft, Oberhausen-Holten, Germany, a corporation of Germany No Drawing. Application November 12, 1953
Serial No. 391,724

Claims priority, application Germany December 31, 1951

20 Claims. (Cl. 260—617)

This invention relates to the production of dialdehydes and conversion products thereof and is a continuation-in-part of U. S. application, Serial No. 327,661, filed December 23, 1952, now abandoned.

Carbon monoxide and hydrogen have been added to compounds having two non-conjugated olefinic double bonds by treating such compounds with carbon monoxide and hydrogen in the presence of cobalt or other catalysts under suitable conditions of pressure and temperature.

These addition reactions did not prove valuable, however, since either the yield of bivalent derivatives was small or the primary reaction products were not sizable.

If carbon monoxide and hydrogen are added to diolefins, all or a predominant portion of the addition occurs at one of the two double bonds. It is for this reason that this reaction is not suitable for the production of dialdehydes. In the reaction dialdehydes are, at best, only partially formed, and reaction conditions are so unfavorable that any initially formed dialdehydes continue to react and form higher molecular by-products such as, for example, resins, due to their extreme sensitivity. (See FIAT Report No. 1000, page 31, and FIAT Review, volume 36, I, page 168, 1948.)

One object of this invention is the production of dialdehydes or conversion products thereof such as diols by the catalytic addition of carbon monoxide and hydrogen to hydrocarbons having at least 2 unsaturated double bonds. This and still further objects will become apparent from the following description:

It has now, very surprisingly, been found that very excellent yields of dialdehydes may be obtained from hydrocarbons having at least two olefinic bonds by the catalytic addition of water gas using as catalysts cobalt compounds supplying cobalt carbonyl hydrogen and effecting the addition in the presence of diluting agents, polymerization inhibitors, and stabilizers. The molecular size of the diolefinic hydrocarbons being processed must be at least such that no conjugated double bonds are present. Apart from this, the double bonds may have any position in the molecule.

The process may particularly advantageously be carried out with the use of cyclic diolefins, in which case these hydrocarbons may contain one or several rings.

In accordance with the invention, the formation of dialdehydes is either completely or extensively effected, and the undesirable side reaction of the sensitive dialdehydes is prevented. In addition to the cobalt compounds supplying cobalt carbonyl hydrogen as the catalysts, metallic cobalt or iron may be used if necessary or desired. Metallic cobalt or such organic or inorganic cobalt salts which contain no oxygen of oxidizing action may be used as the compounds supplying cobalt carbonyl. Unsuited for the formation of carbonyls are, for example, cobalt nitrate or cobalt bichromate.

Aromatic hydrocarbons, substituted aromatics and hydro-aromatics may be used as the diluting agents. Aliphatic hydrocarbons may also be used for this purpose.

With the use of aromatic hydrocarbons as diluting agents, monomeric dialdehydes are formed, whereas if aliphatic hydrocarbons are used as the diluting agents under identical reaction conditions, resinified dialdehydes are sometimes produced.

It has been found particularly advantageous to use a diluting agent which is miscible with the starting diolefin, but which is substantially immiscible with the reaction product obtained, which is methylated at both double bonds.

When using solid or gaseous catalysts, two layers are generally obtained as the reaction product, the upper of which generally contains the diluting agent and the lower of which contains the dialdehyde compound. The monoaldehyde compound which is also formed during the reaction, will generally dissolve in the diluting agent. When using aqueous inorganic cobalt as the basic catalyst material, the reaction product is obtained in the form of three layers after filtration. The middle layer consists of the catalyst solution. The lower layer consists of the dialdehydic reaction product, while the upper layer comprises the diluting agent.

A further advantage in the use of diluting agents which are miscible with the starting diolefin and substantially immiscible with the dialdehydic reaction product resides in the fact that the diluting agent may be separated from the reaction product and the catalyst solution by simple decantation. Without the use of this particular type of diluting agent, separation is only possible by distillation. Further, the use of these diluting agents eliminates the necessity of carrying along the diluting agent through further processing steps as otherwise required, which necessitates the use of enlarged reaction spaces, as, for example, in the hydrogenation of aldehydic raw products to form the corresponding alcohols.

Paraffin hydrocarbons, which boil between 30–150° C. at 760 mm. Hg pressure, and, in particular, heptane, have been found preferable as diluting agents, which are miscible with the starting diolefin as, for example, dicyclopentadiene and substantially immiscible with the dialdehydic reaction product, as, for example, the tricyclodecane-dimethylal.

The diluting agent may be reused, if desired. It is, however, advantageous under certain conditions to process the monoaldehyde contained therein. Thus, for example, the monoaldehyde may be recovered, as, for example, by distillation, converted into the corresponding alcohol by the catalytic addition of hydrogen, and converted into the corresponding carboxylic acid by oxidation. It is also possible to effect a condensation reaction with the monoaldehyde such as an aldolization esterification and etherization.

It may be desirable in individual cases to treat the layer of diluting agent with hot water under pressure at a temperature of about 160–200° C. to thereby decompose the methyl carbonyl compounds and/or acetals dissolved therein.

In the case of the diluting agents which are miscible with the diolefinic starting material and substantially immiscible with the dialdehydic reaction product, the monoaldehyde concentration in the diluting agent should not be allowed to become too high, since larger quantities of monoaldehyde may act as dissolving intermediaries for the dialdehyde, thus making the separation into layers in the sense described above impossible. If, in the production of tricyclodecane dimethylol from dicyclopentadiene, the monoaldehyde component in the diluting agent is maintained, for example, below 10–20%, then a smooth separation of two or three layers will occur in the manner described above.

An incipient polymerization of the hydrocarbons having at least 2 olefinic bonds may be prevented by the addition of metallic cobalt or iron in the form of powder, finely divided iron. The metals used as polymerization in-divided form. Of particular advantage is the use of finely divided iron. The metal used as polymerization inhibitors are employed in a quantity of 5–50 grams and preferably of 10 grams per kg. of starting material.

For the production of dialdehydes in accordance with the invention, the maintaining of a sufficiently low reaction temperature is of prime importance. Thus, for example, if cobalt in a finely divided and reduced state is used as a catalyst for the water gas addition, then the reaction temperature must be below 120° C., the most suitable temperature being 110° C. in this case. If a temperature above this, as, for example, 140° C.–150° C. is used, resinification will occur. If other catalysts, such as aqueous cobalt sulfate solutions, are used for the water gas addition, then temperatures which are generally somewhat higher are used. In this case, the reaction temperature must be below 170° C., the preferred temperature, which allows the successful formation of dialdehydes being 150–160° C. Substantially higher temperatures, however, may produce hydrogenating side reactions.

The carbon monoxide to hydrogen ratio of the gases used for the formation of dialdehydes ranges between 0.7 and 2 parts by volume CO per part by volume $H_2$. Of particular advantage is the use of gases in which 1.5 parts by volume of carbon monoxide are contained per part by volume of hydrogen. An excess of carbon monoxide is advantageous because 4 molecules of CO are consumed for each hydrogen atom in the formation of cobalt carbonyl. An excess pressure of 150–300 kg./sq. cm., and preferably of 250–300 kg./sq. cm. is used during the water-gas addition.

About 0.5–5 grams of cobalt in the form of cobalt carbonyl compounds, and preferably 1.5–2.5 grams of cobalt in the form of cobalt carbonyl compounds are used per kg. of starting product.

It has been found of great advantage, in accordance with the invention, to add stabilizers to the mixture of substances charged for the purpose of stabilizing the dialdehydes formed. Aromatic dioxy compounds may generally be used. Besides hydroquinone, anthraquinone, for example, is well suited for this purpose. The stabilizers are added to the extent of 0.01 to 1% calculated on the starting material, the preferred quantity added being 0.1%. The effect of these stabilizers is to prevent a polymerization and to stabilize the dialdehydes produced.

Yields of at least 50% and frequently of 70% and more of dialdehydes or their derivatives are obtained, in accordance with the invention. By further oxidation, dicarboxylic acids or diesters may also be obtained as derivatives of the dialdehydes produced in accordance with the invention. As contrasted to this in the prior art, dialdehydes or diols could at best be produced in yields of 15–35%.

If, in accordance with the invention, it is desired to recover the dialdehydes, then the raw reaction products should be subjected to a treatment with pressure water for the removal of the dissolved metal and to split any acetals formed. If the hydrogenation of the aldehydes is desired to form diols, then the above-mentioned treatment with pressure water may be combined with the hydrogenation in single operational step. The treatment with water should preferably be effected at a temperature of about 160° C. to 200° C. During this treatment with water a pressure develops which is dependent on the water vapor pressure valid for the temperature used and on the vapor pressure of the solvent used. In general, this treatment with water is carried out at pressures of 15–30 kg./sq. cm.

The process in accordance with the invention must be carried out in the simultaneous presence of diluting agents, polymerization inhibitors and stabilizers. Polymerization inhibitors are understood to be substances which prevent the diolefinic hydrocarbons used as the starting material from polymerizing with themselves, i. e. from forming di-, tri- or still higher polymers. In this way resinification of the reaction products is to be prevented as far as possible. Stabilizers are understood to be substances which protect the aldehydes forming by the catalytic addition of water gas from oxidation, disproportionation and spontaneous decomposition. Examples of suitable polymerization inhibitors are metals, especially iron, cobalt or copper. Most suitable as stabilizers are organic dioxy compounds, preferably hydroquinone or substituted hydroquinones.

Hydrocarbons, especially benzene, toluene, xylene, cyclohexane, hexane, methyl cyclohexane, heptane, octane and still higher homologues are used as diluting agents. These diluting agents must be added in a proportion of at least 1:1. Most suitable is the addition of 4 parts by volume of diluting agent per part by volume of starting material. With regard to the subsequent separation of the diluting agent, this should have an upper boiling limit of about 200° C. It is also possible to use solvents which after the reaction form a layer on top of the reaction products thus permitting their separation. Suitable solvents are, for example, hexane and higher hydrocarbons.

The reaction temperatures in the water gas addition range between 100° and 180° C. When operating with metallic catalysts, temperatures of 100–120° C. are preferably used. If the catalysts consist of cobalt salts, temperatures of 140° to 150° C. must be used.

The pressures must be in excess of 150 kg./sq. cm. The upper limit of the pressures is only set by the resistivity of the reaction vessels, it being possible to use pressures of as high as 1000 kg./sq. cm. and still higher.

Further details may be seen from the following examples which are given by way of illustration and not limitation.

*Example 1*

700 cc. of a reaction mixture consisting of 200 cc. of dicyclopentadiene stabilized with 0.5 gms. hydroquinone, 300 cc. of benzene, and 200 cc. of an aqueous solution which contained per liter 15 gms. of cobalt in the form of cobalt sulfate and 30 gms. of magnesia (MgO) in the form of magnesium sulfate was filled into an autoclave of 2.3 liters capacity provided with a magnetic stirrer. After the addition of 3 gms. of ferrum reductum to this mixture, the autoclave was closed. From a steel bottle, water gas containing 1.2 parts by volume of hydrogen per part by volume of carbon monoxide was introduced to the autoclave until a pressure of 180 kilos/sq. cm. was reached. Thereafter, the stirrer was started and the autoclave was heated up. At a temperature of 140° C., no further increase in pressure could be observed, but a pressure drop occurred. Within 120 minues, 104 kg./sq. cm. of water gas, approximately 50 kg./sq. cm. thereof in the first 30 minutes, were absorbed, the free gas space in the autoclave being 1.3 liters.

After the termination of the gas absorption, the autoclave was cooled and the reaction product was separated from the catalyst solution, mixed with 66% of its volume of water, and heated within the autoclave to about 200° C., thereby splitting up any acetals present and precipitating the metal carbonyls dissolved. After the separation of the water, the reaction product was distilled. After having driven off the solvent, the main fraction, amounting to 60% by weight of the dicyclopentadiene charged, was obtained between 165° C. to 175° C. at a pressure of 10 mm. Hg. This main fraction had the following characteristics:

Density at 20° C., $d_{20}$ _____ 1.122
Refractive index, $n_D^{20}$ _____ 1.5238

Molecular weight _____ 210
Iodine number, I. N _____ 19
Neutralization number, N. N _____ 0.5
Ester number, E. N _____ 39
Hydroxyl number, OH N _____ 43
Carbonyl number, CO N _____ 435

These characteristics indicated that the reaction product had the composition as shown on the following table:

| Wt. percent | Substance | Mol. wt. | I. N. | CO N. | OH N. | E. N. | Proportionate | | | |
|---|---|---|---|---|---|---|---|---|---|---|
| | | | | | | | I. N. | CO N. | OH N | E. N |
| 12.1 | Unsaturated monoaldehyde | 162 | 157 | 345 | | | 19 | 41 | | |
| 67.4 | Dialdehyde | 192 | 0 | 584 | | | 0 | 394 | | |
| 7.5 | Diol | 196 | 0 | 0 | 572 | | 0 | 0 | 43 | |
| 13.3 | Ester (double dialdehyde) | 384 | 0 | 0 | 0 | 292 | 0 | 0 | 0 | 39 |
| 100.3 | | ¹ 214 | | | | | 19 | 435 | 43 | 39 |

¹ Average.

*Example 2*

The reaction mixture used in Example 1 was separated, after completed gas absorption, from the catalyst solution by decantation and filled again into the autoclave which had previously been charged with 50 cc. of reduced nickel hydrogenation catalyst and 200 cc. of water. At a hydrogen pressure of about 50 kilos/sq. cm., the reaction mixture was treated at 60° C. to 100° C. until constancy of pressure occurred. After the completion of the hydrogenation, the oily constituents were separated from the water and from the catalyst and subsequently distilled. An apparatus operating with short distillation paths and a heatable receiver were used for the distillation. After the separation of the benzene, the following fractions were obtained:

Below 180° C. at 2 mm. Hg___20 wt. percent monol containing approximately 25% diol.
180–210° C. at 2 mm. Hg_____56 wt. percent diol.
210–230° C. at 2 mm. Hg____6 wt. percent diol containing approximately 20% ester.
Above 230° C. at 2 mm. Hg___18 wt. percent resin-like residue consisting of esters, aldols, etc.

The total yield of diol was approximately 65% by weight.

*Example 3*

By means of the apparatus used in Example 1, 500 cc. of a dicyclopentadiene-benzene mixture containing 3 parts by volume of benzene for every 2 parts by volume of dicyclopentadiene and being stabilized with 0.1% of hydroquinone were treated with water gas with the use of 100 cc. of reduced cobalt-magnesia-kieselguhr catalyst under the conditions as used in Example 1. The catalyst contained 10 parts of magnesia and 200 parts of kieselguhr for every 100 parts of cobalt. Already at 100° C. a gas absorption occurred, so that a temperature of 110° C. did not have to be exceeded. With a free gas space of 1.5 liters remaining in the autoclave, 100 kilos/sq. cm. of water gas were absorbed within 30 minutes. After cooling to 60° C., the gas was blown off and the reaction mixture was charged with 200 cc. of water, which was injected by means of nitrogen. While stirring the mixture, it was heated to a temperature of 180° C. and maintained for 30 minutes at this level. After cooling, the reaction mixture was separated from the water and hydrogenated as described in Example 1. In the distillation, which was carried out as in Example 1, the following products were obtained at a pressure of 2 mm. Hg:

Below 180° C_____20% by weight monol containing 20% diol.
180–210° C_____37% by weight diol.
210–230° C_____6% by weight diol containing 20% ester.
Above 230° C_____37% by weight esters, aldols, resins.

*Example 4*

By means of cold benzene, a polymerization product was extracted from a polymeric mixture of dicyclopentadiene, which polymerization product had the following characteristics:

Iodine number _____ 188
Molecular weight _____ 225
Pour point _____ ° C. +72

These data indicate that a polymerization product was present which contained 4 molecules of cyclopentadiene. 200 grams (0.785 mole) of this product were dissolved in 300 gms. toluene and filled into a pressure vessel of 2020 cc. capacity. Into the same pressure vessel there were given 300 cc. of an aqueous solution which contained in the form of sulfates 15 grams per liter of cobalt and 25 grams/liter of magnesium oxide and, moreover, 10 grams of iron powder, 0.2 gm. hydroquinone and 0.02 gm. alkyl aryl sulfonate. Thereafter, the pressure vessel was closed. While constantly stirring, water gas consisting of approximately equal parts by volume of carbon monoxide and hydrogen was introduced to the pressure vessel at a temperature of 150–155° C. until a pressure of 280 kilos/sq. cm. was reached. After a treating period of 60 minutes, the water gas pressure had dropped to 188 kilos/sq. cm., which corresponded to a carbon monoxide-hydrogen absorption of 69 standard liters.

The reaction product had a volume of 610 cc. and was freed from its metal content by means of 5% hydrochloric acid. Thereafter, it had the following characteristics:

Iodine number _____ 3
Neutralization number _____ 3
Ester number _____ 8
Hydroxyl number _____ 8
Carbonyl number _____ 96

This product was treated for two hours at 220–300° C. with hydrogen in the presence of a cobalt-thorium oxide-kieselguhr catalyst with the addition of 100 cc. of water. The final product obtained was a two-component mixture from which the thinly liquid portion consisting of toluene could be separated by means of a suction filter. The viscous residue was dissolved at 60°–70° C. in twice the quantity of ethanol and separated from the catalyst by filtration. Thereafter, the solvent was removed by evaporation.

As final product, 169 grams of a varnish-like viscous thick oil were obtained, which had the following characteristics:

Iodine number _____ 3
Neutralization number _____ 2
Ester number _____ 2
Hydroxyl number _____ 340
Carbonyl number _____ 1
Pour point _____ ° C__ 83

The fact that 3.96 mols ($CO+H_2$) had been absorbed indicates that the reaction product was a compound which was hydroformylated on both double bonds.

For the dimethylol of the tetrameric cyclopentadiene $C_{20}H_{24}$ there holds the empirical molecular formula $C_{22}H_{32}O_2$. This compound has a calculated hydroxyl number of 342. The hydroxyl number which was found to be 340 was in satisfactory agreement with this theoretical value.

Example 5

1288 grams of a dipentene mixture having the characteristics:

Density at 20° C._____ 0.859.
Refractive index, $n_D^{20}$_____ 1.4873.
Boiling point_____ 115–120° C. (100 mm. Hg).
Ozone iodine number_____ 327.

were mixed with 1500 cc. cyclohexane. This liquid was given into a pressure vessel and diluted with 100 cc. of an aqueous cobalt sulfate solution which contained per liter 15 grams of cobalt and 25 grams of magnesium oxide in the form of their sulfates. Moreover, 2 gms. hydroquinone, 100 gms. of powdered iron and 0.2 gms. of alkyl aryl sulfonate were added. While constantly stirring, water gas was passed into the pressure vessel at 160° C. until a pressure of 300 kilos/sq. cm. was reached. After a treating period of 3 hours 540 standard liters ($CO+H_2$) had been absorbed.

After the water gas addition, the aldehydic product was separated from the catalyst solution and the iron slurry by filtration. After the addition of 300 cc. of a catalyst which consisted of 100 parts of cobalt metal, 10 parts of magnesium oxide, 5 parts of thorium oxide and 200 parts of kieselguhr, the product was hydrogenated at 190–200° C. and a pressure of 100–150 kilos/sq. cm. with a nitrogen-hydrogen mixture consisting of 70% $H_2$ and 30% $N_2$. After the separation of the catalyst, the alcohol formed was distilled.

At first the first runnings consisting of cyclohexane and terpane methylol distilled over. Then, at a pressure of 1.5 mm. Hg and a temperature between 157° C. and 176° C., a highly viscous, clear fraction was obtained from which, on cooling, a small quantity of a thinly liquid upper layer separated, which was soluble in low hydrocarbons. This layer had the following characteristics:

Density at 20° C_____ 0.907
Refractive index, $n_D^{20}$_____ 1.475
Hydroxyl number_____ 11
Iodine number_____ 15

These data indicate that a mixture of unsaturated and saturated ethers was present.

The bulk of the highly viscous fraction distilled over at 1.5 mm. Hg had the following characteristics:

Density at 20° C_____ 0.982
Refractive index, $n_D^{20}$_____ 1.4880
Hydroxyl number_____ 539
Acid number_____ 0
Ester number_____ 1.2
Iodine number_____ 2
Carbonyl number_____ 0

In the pure form, terpane dimethylol $C_{12}H_{24}O_2$ has a calculated hydroxyl number of 560. Thus, the highly viscous fraction consisted of 96.4% terpane dimethylol.

Example 6

1,000 cc. dicyclopentadiene (7.4 mols), 1.500 cc. heptane, 1,000 cc. cobalt sulfate-magnesium sulfate solution containing 15 grams Co/liter and 15 grams MgO/liter, 50 grams ferrum reductum, 1 gram hydroquinone, and 0.2 gram alkyl aryl sulfonate (95%) were placed into an autoclave of 9.57 liters capacity provided with stirrer. Water gas was then pressed in until a pressure of 195 atmospheres was reached. The autoclave was heated to 155° C. and maintained for 1½ hours at this temperature while making up the pressure to 180 atmospheres. During this time, 165 atmospheres of water gas were absorbed=640 normal liters=28.5 mols $CO+H_2$. The calculated gas quantity is 29.7 mols $CO+H_2$. After cooling to about 30° C., the reaction product was discharged and formed three layers after filtration:

1480 cc. heptane layer having a carbonyl number of 60 and a density at 20° C. of 0.685,
1110 gms. viscous dialdehyde layer having an iodine number of 29, a carbonyl number of 380 and a hydroxyl number of 64, 940 cc. catalyst solution.

The heptane layer was heated for two hours in the autoclave with 10% by volume of water at 200° C., separated after cooling from the water, and filtered. By this treatment, the heptane layer, which contained about 1.0 gram Co and 0.2 gram Fe/liter, and was of a brown-red color, became light yellow and metal-free. In this state, the diluent may be used again. The dialdehyde layer was mixed with 110 cc. of reduced carbon monoxide hydrogenation catalyst and subjected to a hydrating hydrogenation at 230° C. in the presence of 200 cc. of water. The carbon monoxide hydrogenation catalyst consisted, for example, of 100 parts of cobalt metal, 10 parts of magnesium oxide, 5 parts of thorium oxide, and 200 parts of kieselguhr. The raw diol obtained was metal-free, while about 5 grams Co/liter and 2 grams Fe/liter were contained in the raw diol charged.

After fractional distillation there were obtained 122 grams tricyclodecane-methylol,
690 grams tricyclodecane-dimethylol,
278 grams of a resin-like residue consisting of esters, polyesters, and polymeric alcohols.

Example 7

1,000 cc. dicyclopentadiene and 1,500 cc. heptane were subjected to the dialdehyde synthesis effected with 50 grams carbon monoxide hydrogenation catalyst, at a temperature of 110° C., a water gas pressure of 260 atmospheres, and with the addition of 1 gram hydroquinone. The reaction product formed two layers which were separated by decantation. There were obtained 1450 cc. heptane layer and
1160 grams raw dial layer with the catalyst suspended therein.

The heptane layer was treated with water gas at 180° C. without the further addition of catalyst, and subsequently heated for half an hour at 200° C. with the addition of 200 cc. of water. After cooling, the product was separated from the water, filtered off from the metallic hydroxide deposits, separated in flakes, and fractionated. After having distilled off the heptane, there remained 120 grams of higher boiling products which consisted of 76% tricyclodecane-methylol, 11% tricyclodecane-dimethylol, and 13% dicyclopentadiene-polymers. The heptane distilled off was again used for a new batch.

The raw dial layer was diluted with the same volume of 80% ethanol and hydrogenated with hydrogen at 220° C. until the carbonyl number had disappeared. There was obtained a raw diol of a faintly yellow color, which, on distillation under vacuum from a vessel having a packed column of 30 cm. in height, yielded the following fractions:

75–180° C. at 2 mm. Hg: 220 grams tricyclodecane-dimethylol first runnings (cyclopentane-methylol, tricyclodecane - methylol, tricyclodecane+homologues),
180–200° C. at 1.5 mm. Hg: 590 grams tricyclodecane-dimethylol main fraction,
Above 200° C. at 1.5 mm. Hg: 300 grams residue (solid resin-like products, melting point 100–120° C.).

Example 8

The same mixture as used in Example 6 was, after the addition of water gas, separated into three layers by decantation. The heptane layer was mixed with 0.5% manganese butyrate and treated at 40–50° C. with molecular oxygen. After 4 hours, about 80% of the carbonyl number was converted into acid number. The product was subjected to a mild hydrogenation. In the distillation, after having driven off the solvent, there were obtained at 145° C. under 0.7 mm. Hg 80 grams tricyclodecane-carboxylic acid as a syrupy liquid which, after standing for a short time, crystallized well, melted between 45° and 55° C., and had an acid number of 311.

The dialdehyde layer was mixed with the same volume of toluene and freed from its metal content by washing with a 5% aqueous hydrochloric acid at 50° C. After the removal of the acid by washing with water, the purified raw dialdehyde was fractionated. The following fractions were obtained at 1.5 mm. Hg:

84–103° C.: 18.5% first runnings (tricyclodecene-methylal+tricyclodecane-methylal+hydrocarbons),
103–135° C.: 8.7% intermediate fraction (monoaldehyde+dialdehyde),
135–148° C.: 35.2% main fraction (tricyclodecane-dimethylal).
Above 148° C.: 37.6% residue (tricyclodecane-dimethylol, esters+resins).

The dialdehyde obtained is a liquid of low viscosity and a faintly yellow color and somewhat pungent odor which suggests lower fatty acids. It had the following characteristics:

Density at 20° C_____ 1.142
Refractive index, $n_D^{20}$ _____ 1.5260
Carbonyl number _____ 505
Iodine number _____ 5

According to these values, the product contained about 87% tricyclodecane-dimethylal.

We claim:

1. Process for the production of dialdehyde and conversion products thereof, which comprises contacting a hydrocarbon having at least two non-conjugated olefinic bonds with a carbon monoxide hydrogen-containing gas in the presence of a cobalt compound supplying cobalt carbonyl hydride, a hydrocarbon-diluting agent, a polymerization inhibitor, and a stabilizer, and recovering a dialdehydic reaction product.

2. Process according to claim 1, in which said hydrocarbon-diluting agent is a saturated hydrocarbon substantially miscible with said hydrocarbon having at least two non-conjugated olefinic bonds and substantially immiscible with said dialdehydic reaction product.

3. Process according to claim 1, in which said hydrocarbon-diluting agent is selected from the group consisting of aromatic hydrocarbons and hydro-aromatic hydrocarbons.

4. Process according to claim 1, in which said polymerization inhibitor is selected from the group consisting of metallic cobalt and metallic iron.

5. Process according to claim 4, in which said polymerization inhibitor is present in amount of about 5–50 grams per kilogram of starting material.

6. Process according to claim 1, in which said stabilizer is an aromatic oxy compound.

7. Process according to claim 6, in which said stabilizer is hydroquinone.

8. Process according to claim 7, in which said stabilizer is present in the amount of 0.01–1% by weight of the starting material.

9. Process according to claim 1, in which said compounds supplying cobalt carbonyl hydride is present in amount to 0.5–5 grams per kilogram of starting material.

10. Process according to claim 1, in which said cobalt compound supplying cobalt carbonyl hydride is a member selected from the group consisting of metallic cobalt and reduced cobalt compounds, and in which said contacting is effected at a temperature of about 100–120° C.

11. Process according to claim 1, in which the reaction products of said contacting are contacted with water at a temperature of about 160–200° C. for the freeing of aldehydes contained therein of their contents of metals and acetals.

12. Process according to claim 1, in which said diluting agent is a saturated hydrocarbon substantially miscible with said hydrocarbon having at least two non-conjugated olefinic bonds and substantially immiscible with said aldehydic reaction product, and in which said diluting agent and said aldehydic reaction product are separated after said contacting by layer formation.

13. Process according to claim 12, in which the separated diluting agent is contacted with water at a temperature of about 160–200° C. for the freeing thereof of metals and acetals.

14. Process according to claim 13, in which said diluting agent is a paraffin hydrocarbon having a normal boiling point between 30–150° C.

15. Process for the production of tricyclodecane-dimethylol which comprises contacting dicyclopentadiene with a carbon monoxide hydrogren-containing gas in the presence of a cobalt compound supplying cobalt carbonyl hydride, a polymerization inhibitor, a stabilizer and a saturated hydrocarbon-diluting agent substantially miscible with said dicyclopentadiene and substantially immiscible with said tricyclodecane-dimethylol, and recovering tricyclodecane-dimethylol.

16. Process according to claim 15, in which said saturated hydrocarbon diluting agent and said tricyclodecane-dimethylol are separated by layer formation.

17. Process according to claim 16, in which said saturated hydrocarbon diluting agent is recycled in the process after said separation.

18. Process according to claim 15, in which said hydrocarbon diluting agent is a paraffin hydrocarbon normally boiling between 30–150° C.

19. Process according to claim 18, in which said diluting agent is heptane.

20. Process according to claim 15, in which said diluting agent is separated from the reaction products by layer formation, and recycled.

References Cited in the file of this patent

UNITED STATES PATENTS

| | | |
|---|---|---|
| 2,462,448 | Whitman | Feb. 22, 1949 |
| 2,517,383 | Brooks | Aug. 1, 1950 |
| 2,738,370 | Staib et al. | Mar. 13, 1956 |

FOREIGN PATENTS

| | | |
|---|---|---|
| 660,737 | Great Britain | Nov. 14, 1951 |

OTHER REFERENCES

Adkins et al.: J. Org. Chem., vol. 17, July 1952, pp. 980–987.

UNITED STATES PATENT OFFICE
CERTIFICATE OF CORRECTION

Patent No. 2,850,536  September 2, 1958

Karl Büchner et al.

It is hereby certified that error appears in the printed specification of the above numbered patent requiring correction and that the said Letters Patent should read as corrected below.

Column 3, line 2, after "powder," insert -- filings, shavings, or the like, or in any other sufficiently --; line 3, strike out "finely divided iron. The metals used as polymerization in-; line 5, for "metal" read -- metals --; column 7, line 68, for "1.500 cc." read -- 1,500 cc. --; column 8, line 29, for "diol" read -- dial --.

Signed and sealed this 4th day of November 1958.

(SEAL)
Attest:
KARL H. AXLINE
Attesting Officer

ROBERT C. WATSON
Commissioner of Patents